3,185,601
POLYISOBUTENE GAS-PRODUCING COMPOSITIONS CONTAINING ALUMINUM
Barry Hilton Newman, Cheshunt, Graham James Spickernell, Waltham Abbey, and George Harold Sidney Young, Enfield, England, assignors to Minister of Aviation in Her Majesty's Government of the United Kingdom of Great Britain and Northern Ireland, London, England
No Drawing. Filed Oct. 25, 1962, Ser. No. 234,004
Claims priority, application Great Britain, Oct. 27, 1961, 38,515/61
6 Claims. (Cl. 149—19)

The invention relates to gas-producing compositions which may be used in rocket motors, fluid ejection systems, pressurising systems, engine starter cartridges and like devices in which gas is required to be generated under pressure.

An object of the invention is to provide gas-producing compositions which are of particular application as high-performance propellants having very high specific impulses and thrust efficiencies.

A further object of the invention is to provide gas-producing compositions which are plastic and capable of being easily formed into any desired shape and which have a high performance with little variation under severe operating conditions.

In accordance with the invention, these and other objects may be obtained by providing gas producing compositions consisting of an intimate mixture of constituents including finely divided aluminum metal and one or more solid oxidising agents, the said mixture being bound together by a visco-elastic binder which is a linear polymeric alkene. Aluminum metal may be advantageously incorporated in these gas producing compositions in proportions of between about 2–24 percent by weight and preferably between about 5–20 percent by weight.

Various grades of finely-divided aluminum may be used, two commercially available forms being atomised (or blown) material, generally having a specific surface area in the range 1,000 to 15,000 $cm.^2/cm.^3$, and flake material, generally having a specific surface area in the range 15,000 to 90,000 $cm.^2/cm.^3$. The atomised (or blown) material normally consists of particles of aluminum which are roughly spherical in shape and which are of the order of 99.5 percent pure; the flake material consists of very thin flat plates of aluminum which are coated with a layer of an anti-caking/anti-oxidising compound, and thus the resulting purity of this material is less than that of the atomised grade and is seldom greater than 98 percent.

We have found that, although aluminum may be incorporated into plastic gas-producing compositions in any proportion without affecting the chemical stability of the compositions, there is a rheological limit to the proportion of flake aluminum which can be incorporated. Thus, the plate-like form of the particles compositing the flake grade causes the inter-particle friction of the compositions to increase progressively with increase in the proportion of flake grade incorporated, making the compositions correspondingly harder and more difficult to process. We have shown that for large-scale manufacture the maximum proportion of flake aluminum which may be included in a composition without seriously affecting its processability is about six percent of the total weight of the composition.

The atomised grade of aluminum does not cause any significant increase in inter-particle friction and consequently when compositions containing more than about six percent of aluminum are prepared, the atomised grade must be used. It is, however, sometimes advantageous to use a proportion of the flake grade admixed with the atomised grade and the other constituents of the compositions in order to "stiffen" certain compositions which would otherwise be too plastic and deformable for application as, for example, propellants.

The measured performance of the aluminum-containing compositions as propellants is affected little by variations in the particle size of the aluminum used, the measured specific impulse and thrust efficiency being virtually unchanged by particle sizes (measured in terms of specific surface area) ranging from about 3,500 $cm.^2/cm.^3$ to about 24,000 $cm.^2/cm.^3$ whether the aluminum be atomised grade, flake grade, or a mixture of these. The aluminum particle size does, however, affect the burning rate and the pressure and temperature dependence of the compositions; the finer grades of atomised aluminum reduce the temperature coefficient of the burning rate whilst the flake aluminum increases the burning rate and reduces the pressure and temperature dependence.

In addition to aluminum metal, plastic gas-producing compositions according to the present invention contain one or more oxidising agents and a polymeric alkene visco-elastic binder which polymeric alkene visco-elastic binder should have a viscosity within the range 250,000 to 7,000,000 poises at 25° C. and the viscosity value is preferably within the range 400,000 to 1,000,000 poises at 25° C. A suitable alkene binder is polyisobutene or polypropene. A small proportion of an alkyl ester, preferably of lower freezing point than the binder, may be added as a plasticiser.

The action of the binder may be improved by the incorporation of a small quantity of surface active or wetting agent. This may be a naturally occurring surfactant such as lecithin, or a synthetic composition consisting of a mixture of at least two compounds of which at least one is an organic sulphate, an inorganic salt of an esterified dibasic sulphonated acid or an ester of a long chain fatty acid. Preferably each one of at least two of the compounds making up the surface active agent is either an alkali alkyl sulphate, an inorganic salt of a dialkyl sulphosuccinate, an alkyl oleate, or a polyoleate such as pentaerythritoldioleate. Examples of alkyl oleates which may be used are ethyl oleate and tetrahydrofurfuryl oleate.

A preferred surface active agent for incorporation in a gas-producing composition comprises three compounds which are a polyoleate such as pentaerythritol dioleate, an alkyl oleate, and an inorganic salt of dialkyl sulphosuccinate. An example of such a surface active agent is a particular surface active agent S which has a composition as follows:

| | Percent |
|---|---|
| Pentaerythritol dioleate | 30 |
| Ethyl oleate | 40 |
| Sodium di(2-ethyl hexyl) sulphosuccinate | 30 |

Either of the "2-ethyl hexyl" groups in the last component may be in an isomeric form such as dioctyl.

Preferred non-binder constituents of the gas-producing compositions according to the present invention other than aluminum are ammonium nitrate, ammonium perchlorate, ammonium picrate and oxamide. Ammonium nitrate and ammonium perchlorate are oxidizing agents which aid the burning of the compositions whilst ammonium picrate and oxamide are coolants which moderate the burning action. The rate of burning may be regulated by using ammonium nitrate and/or ammonium perchlorate together with ammonium picrate and/or oxamide in appropriate proportions. In addition a small proportion of a burning rate catalyst may be incorporated into the compositions.

In accordance with the invention, a general gas-producing composition is as follows:

| | Percent |
|---|---|
| Aluminum | 2–24 |
| Polyisobutene binder | 8–15 |
| Oxidising agent | 90–35 |
| Coolant | 0–50 |
| Surface active agent | 1 |
| Catalyst | 0–2 |

A general composition, in which the oxidising agent is ammonium perchlorate and in which the coolant is ammonium picrate and/or oxamide, is as follows:

| | Percent |
|---|---|
| Aluminum | 5–20 |
| Polyisobutene binder | 8–15 |
| Ammonium perchlorate | 89–40 |
| Oxamide | 0–5 |
| Surface active agent S | 1 |
| Catalyst | 0–2 |

The proportion of catalyst added is normally between 1 and 2%. Catalysts which may be used are normally those which effect an increase in the rate of burning of the gas-producing compositions such as, for example, copper chromate.

Particular compositions which lie within the general formula given above will now be described in the following examples with their burning rates when used as a propellant and their measured specific impulses at 1,000 lbs./sq. in. (except where stated) when expanded to 14.7 lbs./sq. in., together with the values of the initial specific surface area (S.S.A.) of the aluminum and ammonium perchlorate used where these differ from 3,500 cm.$^2$/cm.$^3$ and 2,000 cm.$^2$/cm.$^3$ respectively:

Example 1

| | Percent |
|---|---|
| Aluminum (atomised) | 5 |
| Polyisobutene binder | 10 |
| Ammonium perchlorate | 84 |
| Surface active agent S | 1 |

The burning rate is 0.70 inch/sec. and the specific impulse is 243 lb. sec./lb.

Example 2

| | Percent |
|---|---|
| Aluminum (atomised) | 10 |
| Polyisobutene binder | 10 |
| Ammonium perchlorate | 79 |
| Surface active agent S | 1 |

The burning rate is 0.65 inch/sec. and the specific impulse is 246 lb. sec./lb.

Example 3

| | Percent |
|---|---|
| Aluminum (atomised) | 14 |
| Polyisobutene binder | 10 |
| Ammonium perchlorate | 75 |
| Surface active agent S | 1 |

The burning rate is 0.62 inch/sec. and the specific impulse is 247 lb. sec./lb.

Example 4

| | Percent |
|---|---|
| Aluminum (atomised) | 18 |
| Polyisobutene binder | 10 |
| Ammonium perchlorate | 71 |
| Surface active agent S | 1 |

The burning rate is 0.588 inch/sec. and the specific impulse is 245 lb. sec./lb.

Example 5

| | Percent |
|---|---|
| Aluminum (atomised) | 10 |
| Polyisobutene binder | 12 |
| Ammonium perchlorate | 77 |
| Surface active agent S | 1 |

The burning rate is 0.57 inch/sec. and the specific impulse is 242 lb. sec./lb.

Example 6

| | Percent |
|---|---|
| Aluminum (atomised—S.S.A. 13,500 cm.$^2$/cm.$^3$) | 10 |
| Polyisobutene binder | 12 |
| Ammonium perchlorate | 77 |
| Surface active agent S | 1 |

The burning rate is 0.55 inch/sec. and the specific impulse is 240 lb. sec./lb.

Example 7

| | Percent |
|---|---|
| Aluminum (1/1 atomised/flake mixture—S.S.A. 24,000 cm.$^2$/cm.$^3$) | 10 |
| Polyisobutene binder | 12 |
| Ammonium perchlorate | 77 |
| Surface active agent S | 1 |

The burning rate is 0.67 inch/sec. and the specific impulse is 240 lb. sec./lb.

Example 8

| | Percent |
|---|---|
| Aluminum (atomised) | 8 |
| Polyisobutene binder | 10 |
| Ammonium perchlorate | 71 |
| Ammonia picrate | 10 |
| Surface active agent S | 1 |

The burning rate is 0.430 inch/sec. and the specific impulse is 239 lb. sec./lb.

Example 9

| | Percent |
|---|---|
| Aluminum (atomised) | 8 |
| Polyisobutene binder | 10 |
| Ammonium perchlorate | 51 |
| Ammonium picrate | 30 |
| Surface active agent S | 1 |

The burning rate of 0.193 inch/sec. and the specific impulse is 218.5 lb. sec./lb.

Example 10

| | Percent |
|---|---|
| Aluminum (flake—S.S.A. 24,000 cm.$^2$/cm.$^3$) | 5 |
| Polyisobutene binder | 12 |
| Ammonium perchlorate | 59 |
| Ammonium picrate | 23 |
| Surface active agent S | 1 |

The burning rate is 0.326 inch/sec. and the specific impulse is 223 lb. sec./lb.

Example 11

| | Percent |
|---|---|
| Aluminum: | |
| Atomised | 1 |
| Flake S.S.A. 24,000 cm.$^2$/cm.$^3$ | 2 |
| Polyisobutene binder | 11 |
| Ammonium perchlorate | 41 |
| Ammonium picrate | 39 |
| Oxamide | 5 |
| Surface active agent S | 1 |

The burning rate is 0.125 inch/sec.

Example 12

| | Percent |
|---|---|
| Aluminum (atomised) | 14 |
| Polyisobutene binder | 10 |
| Ammonium perchlorate | 74 |
| Surface active agent S | 1 |
| Copper chromate | 1 |

The burning rate is 1.24 inches/sec. and the specific impulse is 251.5 lb. sec./lb. (at 1,500 lb./sq. in.).

Example 13

| Ingredient | Percent |
|---|---|
| Aluminum (atomised) | 14 |
| Polyisobutene binder | 10 |
| Ammonium perchlorate (S.S.A. 8,000 cm.²/cm.³) | 74 |
| Surface active agent S | 1 |
| Copper chromate | 1 |

The burning rate is 1.65 inches/sec. and the measured specific impulse is 251.5 lb. sec./lb. (at 1,500 lbs./sq. in.).

Example 14

| Ingredient | Percent |
|---|---|
| Aluminum (atomised) | 2 |
| Polyisobutene binder | 10 |
| Ammonium perchlorate | 86 |
| Surface active agent S | 1 |
| Copper chromate | 1 |

The burning rate is 1.14 inches/sec. and the specific impulse is 241.5 lb. sec./lb.

Example 15

| Ingredient | Percent |
|---|---|
| Aluminum (atomised) | 10 |
| Polyisobutene binder | 10 |
| Ammonium perchlorate | 78 |
| Surface active agent S | 1 |
| Copper chromate | 1 |

The burning rate is 1.01 inches/sec. and the specific impulse 245 lbs. sec./lb.

A process for the manufacture of plastic gas producing compositions in accordance with the invention is as follows:

Mixtures of particulate aluminum and an oxidizing agent, such as ammonium perchlorate, are extremely friction-sensitive. Accordingly, a pre-mix of particulate aluminum and visco-elastic binder is made, the binder forming a protective lubricant film on the surface of the aluminum particles which prevents direct frictional contact between the aluminum particles and subsequently between particles of aluminum and oxidising agent.

The pre-mix of particulate aluminum and binder may be prepared conveniently in mixing machines such as the Baker Perkins double-knaben-bladed "Imperial" incorporator or a sigma-bladed Winkworth incorporator.

Polyisobutene, which is the binder most commonly used in the plastic compositions according to the invention may be obtained in a number of grades varying from an easily pourable liquid to a rubbery semi-solid, depending on the molecular weight. The viscosity of the polyisobutene used as a binder for the plastic propellant is preferably between 400,000 and 1,000,000 poises at 25° C., determined by a falling sphere method in accordance with British Standard No. 188/1937. This viscosity produces propellant material having the necessary rheological properties while the manufacturing temperatures are safely below temperatures at which decomposition or explosion occurs.

Polyisobutene which has a higher viscosity than that specified may be used by blending with other material having a viscosity value at the lower end of the range. Blending can be carried out by mixing suitable proportions of the high and low viscosity material for 12 hours at about 90° C.

In the manufacture of compositions containing ethyl oleate, the polyisobutene is mixed with ethyl oleate at this stage.

The oxidising agent, ammonium perchlorate, is initially crushed to a size suitable for feeding to a mill. The roughly crushed salt is then dried in an oven to a moisture content of less than 0.1 percent, since the particle size of the product from a dry grinding mill varies with the moisture content of the feed. The drying may be conveniently carried out in any form of tray stove, preferably with hot air circulating at 140° to 160° F., the drying cycle being 12 hours.

The final reduction of the ammonium perchlorate to the desired particle size is carried out by a hammer mill such as a Harrison Carter Disintegrator or a Bramigk Mikro-Pulveriser. All the bearings of the crushing and milling machines are sealed to prevent the ingress of ammonium perchlorate dust, which could form an explosive mixture with the lubricant in the bearings.

The effect of initial particle size of ammonium picrate, ammonium nitrate or oxamide on the burning rate of the propellant composition is small and it is sufficient merely to prepare the ammonium picrate and ammonium nitrate and/or oxamide if used by passing them through say a 60 B.S.S. mesh sieve.

The ammonium perchlorate, ammonium picrate, ammonium nitrate and/or oxamide if used, and polyisobutene binder prepared as described are loaded into an incorporator in weighed proportions together with a weighed proportion of the pre-mix of aluminum and polyisobutene binder in accordance with the particular propellant composition being made. The surface active agent S and any catalyst required are also added and the charge is mixed for about two hours preferably at about 140° F. A suitable machine is a Baker Perkins Imperial incorporator.

To improve the rheological properties of the propellant the material is then passed between knurled differential rolls heated at 140° F., the gap between the rolls being kept at 0.01 inch. In this process the binder is spread evenly over the surface of the crystals, forming a lubricating film which improves the flow properties of the propellant. The number of times the propellant is passed between the rolls effects the particle size of the solid ingredients, which in turn determines the rate of burning of the propellant. A machine on which this process may be performed is the Torrance Micro-Twin.

As an alternative to the incorporation and rolling process described, the constituents of the propellant charge may be blended in an incorporator with a high power input, for example rubber mixing types with high blade speeds, which are capable of producing acceptable propellants without the need for a rolling process. For a 250 lb. mix a power input of about 40 to 50 H.P. is required.

To ensure satisfactory burning of the propellant charges produced by either of these method as much air as possible is removed. This may be done in a deaerating pug mill as used in the clay working industries; it consists of two screw extruders, separated by a vacuum chamber, the input extruder being at a higher level than the output extruder. The propellant is extruded at 160° F. in the form of cords through a die plate by the top screw into the vacuum chamber which is maintained at a pressure of 1 to 5 mm. Hg. The air is removed from the propellant as it enters the vacuum chamber and the cords are cut off by a knife, carried by the top screw, which rotates just clear of the die plate. The deaerated propellant charge falls into the lower screw and is then extruded through a die in consolidated form.

We claim:

1. A gas-producing composition consisting essentially of the following ingredients:

| Ingredients: | Percent by weight |
|---|---|
| Aluminum | 2 to 24 |
| Polyisobutene | 8 to 15 |
| Inorganic oxidising agent selected from the group consisting of ammonium nitrate and ammonium perchlorate, | 35 to 90 |
| Coolant selected from the group consisting of ammonium picrate, oxamide and mixtures thereof, | Up to 50 |
| Surface active agent consisting essentially of pentaerythritol dioleate, a compound selected from | 1 |

Ingredients:—Continued   Percent by weight
    the group consisting of ethyl oleate and tetrahydrofurfuryl oleate and an inorganic salt of dialkyl sulphosuccinate, in substantially equal amounts and,
  Burning rate catalyst _____ Up to 2
    in which the aluminum is of a form having a specific surface area in the range 1,000 cm.$^2$/cm.$^3$ to 90,000 cm.$^2$/cm.$^3$.

2. A gas-producing composition consisting essentially of the following ingredients:

Ingredients:   Percent by weight
  Aluminum _____ 5
  Polyisobutene _____ 10
  Ammonium perchlorate _____ 84
  Surface active agent _____ 1
    consisting essentially of 30% pentaerythritol dioleate, ethyl oleate and sodium di(2-ethyl hexyl) sulphosuccinate.

3. A gas-producing composition consisting essentially of the following ingredients:

Ingredients:   Percent by weight
  Aluminum _____ 5
  Polyisobutene _____ 12
  Ammonium perchlorate _____ 59
  Ammonium picrate _____ 23
  Surface active agent _____ 1
    consisting essentially of 30% pentaerythritol dioleate, 40% ethyl oleate and 30% sodium di(2-ethyl hexyl) sulphosuccinate.

4. A gas-producing composition consisting essentially of the following ingredients:

Ingredients:   Percent by weight
  Aluminum _____ 3
  Polyisobutene _____ 11
  Ammonium perchlorate _____ 41
  Ammonium picrate _____ 39
  Oxamide _____ 5
  Surface active agent _____ 1
    consisting essentially of pentaerythritol dioleate, ethyl oleate and sodium (di-ethyl hexyl) sulphosuccinate in substantially equal amounts, wherein the aluminum is a mixture of 1% atomised form having a specific surface area in the range of 1,000 to 15,000 cm.$^2$/cm.$^3$, and 2% flake form having a specific surface area in the range of 15,000 to 90,000 cm.$^2$/cm.$^3$.

5. A gas-producing composition consisting essentially of the following ingredients:

Ingredients:   Percent by weight
  Aluminum _____ 5
  Polyisobutene _____ 12
  Ammonium perchlorate _____ 59
  Ammonium picrate _____ 23
  Surface active agent _____ 1
    consisting essentially of pentaerythritol dioleate, ethyl oleate and sodium (di-ethyl hexyl) sulphosuccinate in substantially equal amounts, wherein the aluminum is of the flake form having a specific surface area of about 24,000 cm.$^2$/cm.$^3$.

6. A gas-producing composition consisting essentially of the following ingredients:

Ingredients:   Percent by weight
  Aluminum _____ 14
  Polyisobutene _____ 10
  Ammonium perchlorate _____ 74
  Copper chromate _____ 1
  Surface active agent _____ 1
    consisting of pentaerythritol dioleate, ethyl oleate and sodium (di-ethyl hexyl) sulphosuccinate in substantially equal amounts, wherein the aluminum is substantially spherical particles having a specific surface area in the range 1,000 to 15,000 cm.$^2$/cm.$^3$.

References Cited by the Examiner
UNITED STATES PATENTS

| | | | |
|---|---|---|---|
| 2,857,258 | 10/58 | Thomas | 149—19 |
| 2,995,431 | 8/61 | Bice | 149—19 |
| 3,054,702 | 9/62 | Stengel et al. | 149—21 |
| 3,073,730 | 1/63 | Doe et al. | 149—19 |
| 3,084,084 | 4/63 | D'Alelio | 149—44 |

OTHER REFERENCES

Kitt et al.: "Rocket Propellant Handbook," N.Y., The Macmillan Co. (TL 785, K5C.2), pp. 39–42.

CARL D. QUARFORTH, *Primary Examiner.*